United States Patent
Clendinning

(10) Patent No.: US 10,920,962 B2
(45) Date of Patent: Feb. 16, 2021

(54) METHOD AND LIGHT SOURCE FOR GENERATING A TAILORED SPECTRUM LIGHT OUTPUT

(71) Applicant: Ocean Optics, Inc., Largo, FL (US)

(72) Inventor: Kirk Clendinning, Winter Springs, FL (US)

(73) Assignee: Ocean Optics, Inc., Largo, FL (US)

( * ) Notice: Subject to any disclaimer, the term of this patent is extended or adjusted under 35 U.S.C. 154(b) by 0 days.

(21) Appl. No.: 15/903,152

(22) Filed: Feb. 23, 2018

(65) Prior Publication Data

US 2018/0274755 A1     Sep. 27, 2018

Related U.S. Application Data

(60) Provisional application No. 62/475,270, filed on Mar. 23, 2017.

(51) Int. Cl.
| | |
|---|---|
| *F21V 9/32* | (2018.01) |
| *F21V 3/02* | (2006.01) |
| *G01J 3/02* | (2006.01) |
| *G01N 21/00* | (2006.01) |
| *G01N 21/27* | (2006.01) |
| *F21Y 115/10* | (2016.01) |

(52) U.S. Cl.
CPC .............. *F21V 9/32* (2018.02); *F21V 3/02* (2013.01); *G01J 3/0297* (2013.01); *G01N 21/00* (2013.01); *G01N 21/278* (2013.01); *F21Y 2115/10* (2016.08)

(58) Field of Classification Search
CPC . F21V 9/32; F21V 3/02; G01J 3/0297; G01N 21/00; G01N 21/278
See application file for complete search history.

(56) References Cited

U.S. PATENT DOCUMENTS

| | | | |
|---|---|---|---|
| 8,515,226 B2 | 8/2013 | Tatsch | |
| 2012/0224363 A1* | 9/2012 | Van De Ven | ............. F21K 9/60 362/231 |
| 2014/0080230 A1* | 3/2014 | Sohn | ..................... G01J 3/0251 438/7 |
| 2014/0227806 A1 | 8/2014 | Sohn et al. | |
| 2015/0355087 A1 | 12/2015 | Moggridge | |

FOREIGN PATENT DOCUMENTS

JP          2002-236076 A      8/2002

OTHER PUBLICATIONS

International Application No. PCT/US18/21468, International Search Report and Written Opinion dated May 15, 2018.
No Author. *Labsphere Integrating Sphere Theory and Application Technical Guide.* pp. 1-22, (2017).

* cited by examiner

*Primary Examiner* — Rajarshi Chakraborty
*Assistant Examiner* — Nathaniel J Lee
(74) *Attorney, Agent, or Firm* — Dinsmore & Shohl LLP

(57) ABSTRACT

A method for generating uniform light with a tailored spectrum using one or more light sources, an integrating space, and one or more selected phosphors to build stable absolute irradiance calibration light sources for fiber and cosine correctors is disclosed.

18 Claims, 5 Drawing Sheets

METHOD AND LIGHT SOURCE FOR GENERATING A TAILORED SPECTRUM LIGHT OUTPUT

CROSS-REFERENCE TO RELATED APPLICATION

The present application claims the benefit of previously filed co-pending Provisional Patent Application, Ser. No. 62/475,270, filed on Mar. 23, 2017.

FIELD OF THE INVENTION

The method of this disclosure belongs to the field of calibration light sources for fiber and cosine correctors. More specifically it is a method for generating uniform light with a tailored spectrum using one or more light sources, an integrating space, and one or more selected phosphors.

BACKGROUND OF THE INVENTION

Phosphors have long been used to redistribute short wavelength light energy at longer wavelengths. Multiple wavelength light sources have been used to approximate custom spectra. Even combining remote phosphors and short wavelength light sources to tailor spectra is well documented. But, by exciting an integrating space with one or more light sources and selected phosphors coating well chosen surface areas, a custom broadband spectrum with uniformly distributed, diffuse light can be fabricated.

Light sources for calibrating spectrometers have long been problematic. Delivering uniformly distributed, diffuse light within the acceptance cone of an optical fiber or to a cosine corrector has been an inexact or expensive proposition. An inexpensive solar simulator for testing solar cells or calibrating cosine correctors for absolute irradiance of sunlight is another example of a difficult light source to build inexpensively. Thus, the need exists for a method to generate uniformly distributed, diffuse light with a tailored spectrum.

BRIEF SUMMARY OF THE INVENTION

The method of this disclosure is used for generating uniformly distributed, diffuse light having a tailored spectrum using one or more light sources, an integrating space, and one or more selected phosphors. While an integrating sphere produces more uniform distribution, an integrating space can be used should installation space be constrained, or modified light distribution be desirable.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

The intended use of the method of this disclosure is to build stable absolute irradiance calibration light sources for fiber and cosine correctors. The preferred embodiment of this disclosure is done with an integrating sphere. However, the term integrating space is used to indicate that a sphere is not necessary. Even though the light distribution would not be as good in an integrating space other than a sphere, as long as the irradiance at the output port is known, then the method could be used for calibration. In the case of a simple light source, the shape of the enclosure of the "integrating space" and required irradiance at the port would dictate the integrating space shape.

Light exiting a port, or opening, in an integrating sphere is uniform due to the tendency of a diffuse inner spherical surface to spread light energy evenly across its area. Such an integrating sphere was disclosed in U.S. Pat. No. 8,515,226, Spherical Optical Splitter/Combiner, assigned to Ocean Optics, Inc. (the assignee of this application) and incorporated herein. Given a highly reflective but non-specular inner coating, photons injected into a sphere bounce at random angles and many times before finally being absorbed. This increase in photon density is described by the multiplication factor of an integrating sphere. *The Labsphere Integrating Sphere Theory and Applications Technical Guide* (https://www.labsphere.com/site/assets/files/2551/a-guide-to-integrating-sphere-theory-and-applications.pdf) describes reflections inside integrating spheres in detail on page 3 as well as defining the Multiplication Factor, which is expressed as:

$$M = \frac{\rho}{1 - \rho(1 - f)}$$

where M is the multiplication factor, p is the reflectance at a given wavelength, and f is the port fraction. As the amount of surface area dedicated to ports increases, the multiplication factor, and thus density of light across the surface, decreases.

Phosphors absorb light at a particular wavelength and re-emit it at another, longer, wavelength. If a part of an integrating sphere inner surface were phosphor rather than a broad wavelength reflecting material, that would decrease the multiplication factor, and thus photon density, at the phosphor's absorption wavelength. However, photons at the phosphor's re-emission wavelength would be spread evenly across the surface, just as if another light source were added, resulting in a uniform blending of the photons from the two light sources at the exit ports. In the case of a cosine corrector or optical fiber, the resulting light would be similar to a two wavelength, diffuse light source in an open space. Judicious selection of light sources, phosphors and surface areas, balancing reflection, absorption and re-emission, provides a novel and unique way to synthesize diverse spectra. Absorption or reflection of specific wavelength's photons by the sphere's inner coating affords even more control of the spectrum.

Figure 1:
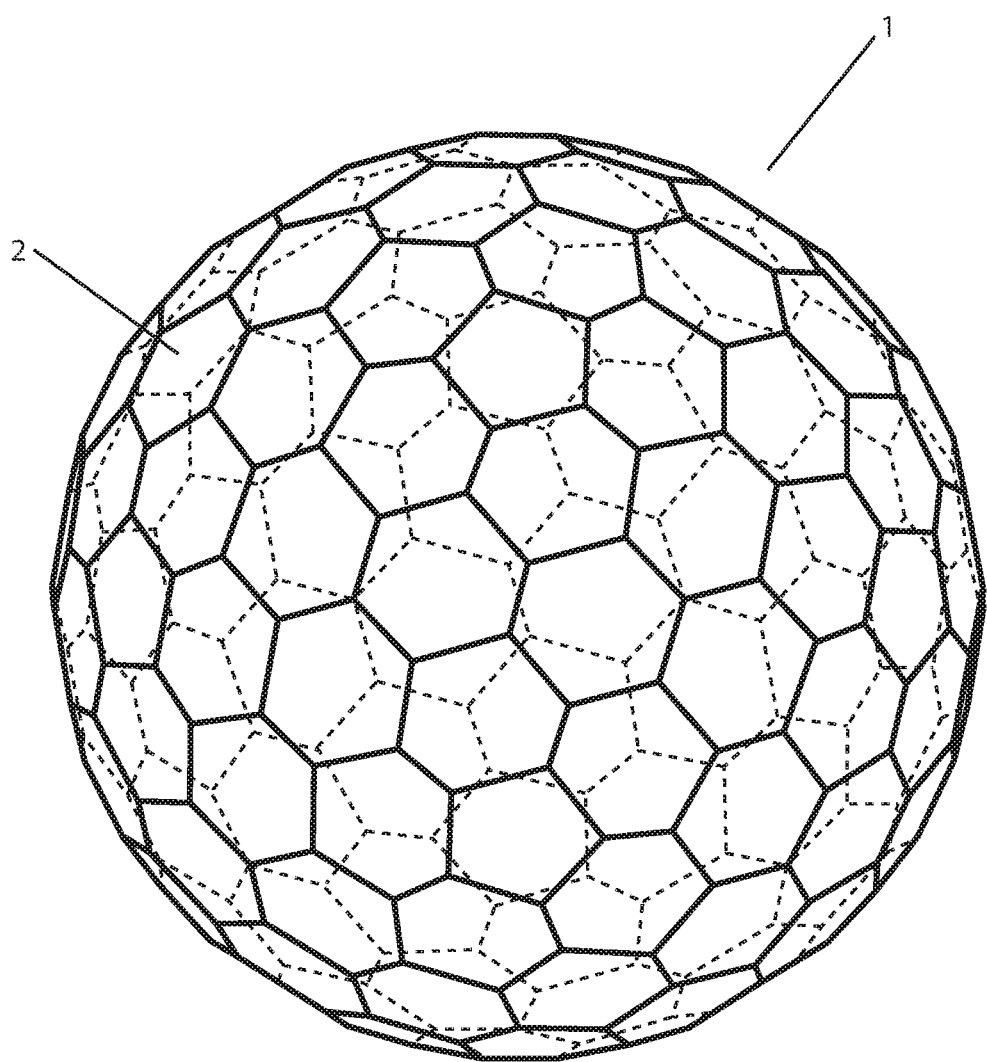
FIG. 1 shows an integrating polyhedron geodesic sphere used in the preferred embodiment method; and, FIGS. 1a through 1d show various embodiments of the disclosed light source having a light integrating space and the associated method, where each insert graph showing light spectra includes a horizontal axis representing the optical wavelength which increases from the left towards the right and a vertical axis representing the optical power or light intensity.

In practical terms an integrating sphere with many ports as an integrating space could be used to produce custom spectra by coating individual port covers with the appropriate surface areas of phosphors and choosing pertinent LED light sources. A preferred embodiment using the disclosed method with a polyhedron geodesic sphere integrating space is shown in FIG. 1. Each element (2) of the polyhedron geodesic sphere (1) is used either as a broad wavelength reflector, a broad wavelength absorber, a narrow wavelength reflector, a narrow wavelength absorber, a phosphor surface, a light source or an exit port (20).

Illustrations of how the disclosed method of this application works are shown in the FIGS. 1a through 1d. In general the phosphor surface area is balanced against source radiation and the balance of energy is dependent upon the light source energies and surface areas of the phosphors. Note that the figures do not represent actual phosphor characteristics.

Figure 1A:
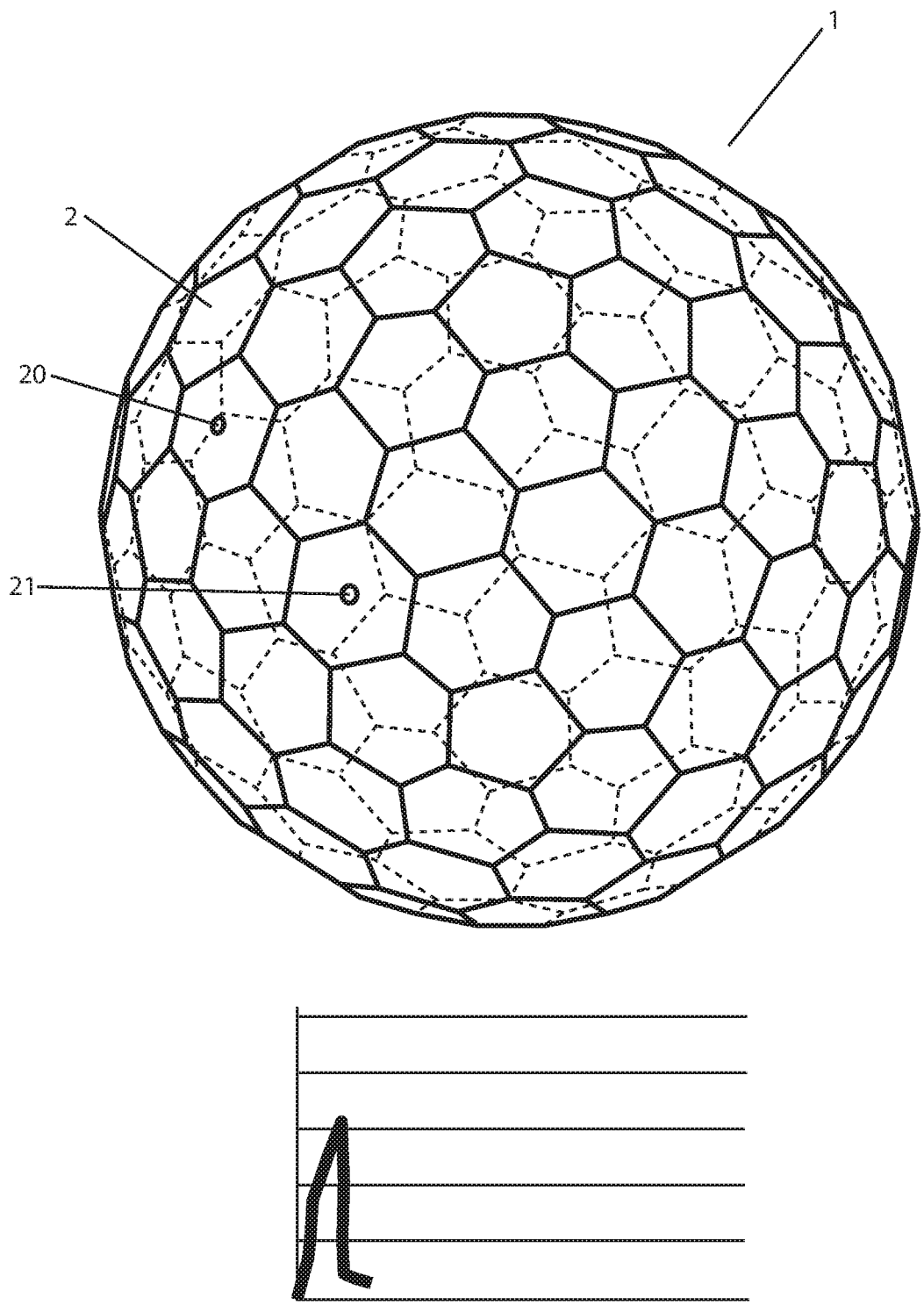

FIG. 1a shows an integrating polyhedron geodesic sphere (1) with an exit port element (20) and a blue LED light source element (21). The blue energy is represented by the solid line in the graphs at the bottom of the figures.

Figure 1B:
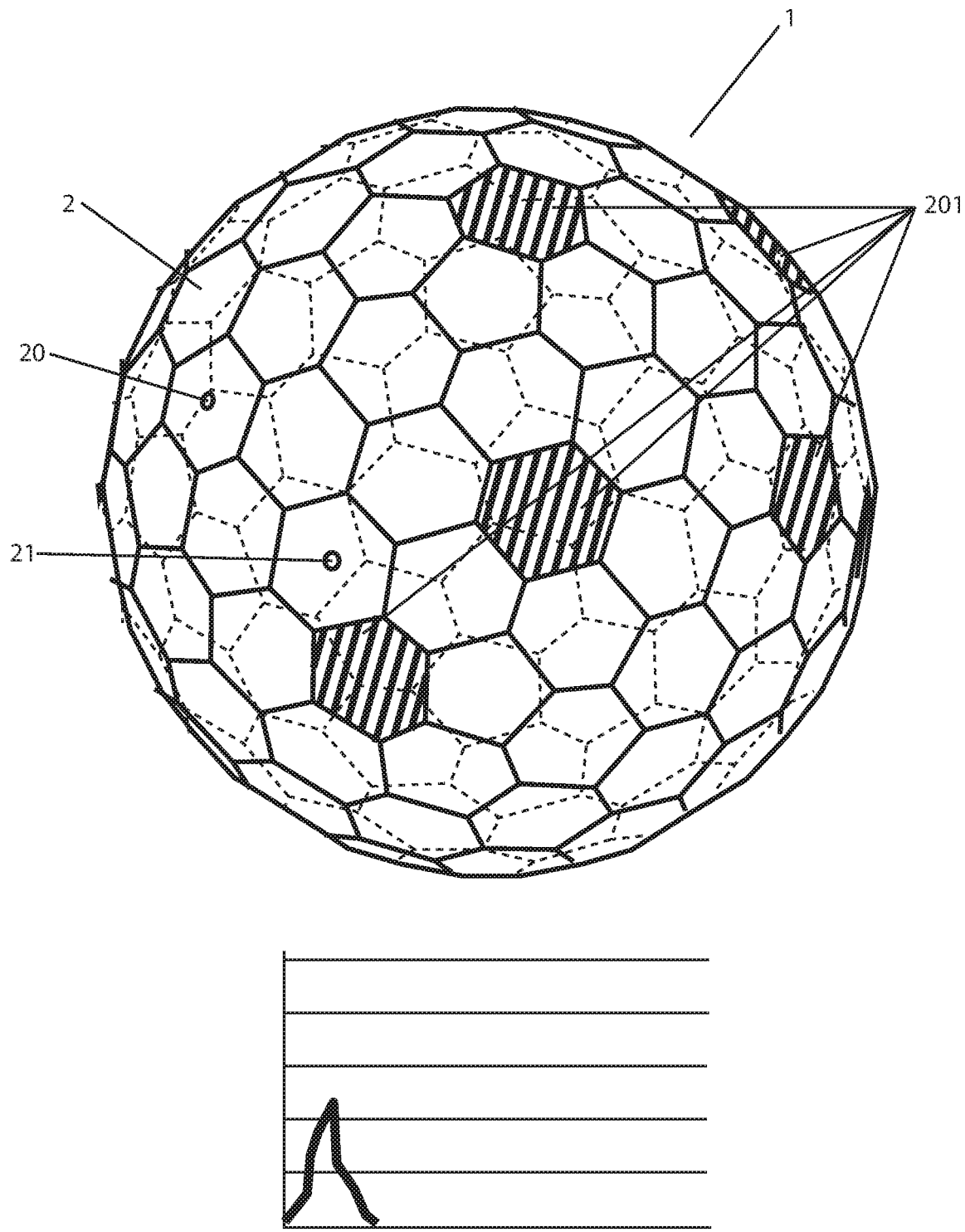

FIG. 1b shows the integrating polyhedron geodesic sphere (1) with green phosphor coated elements (201) added. Note that the blue energy is absorbed.

Figure 1C:
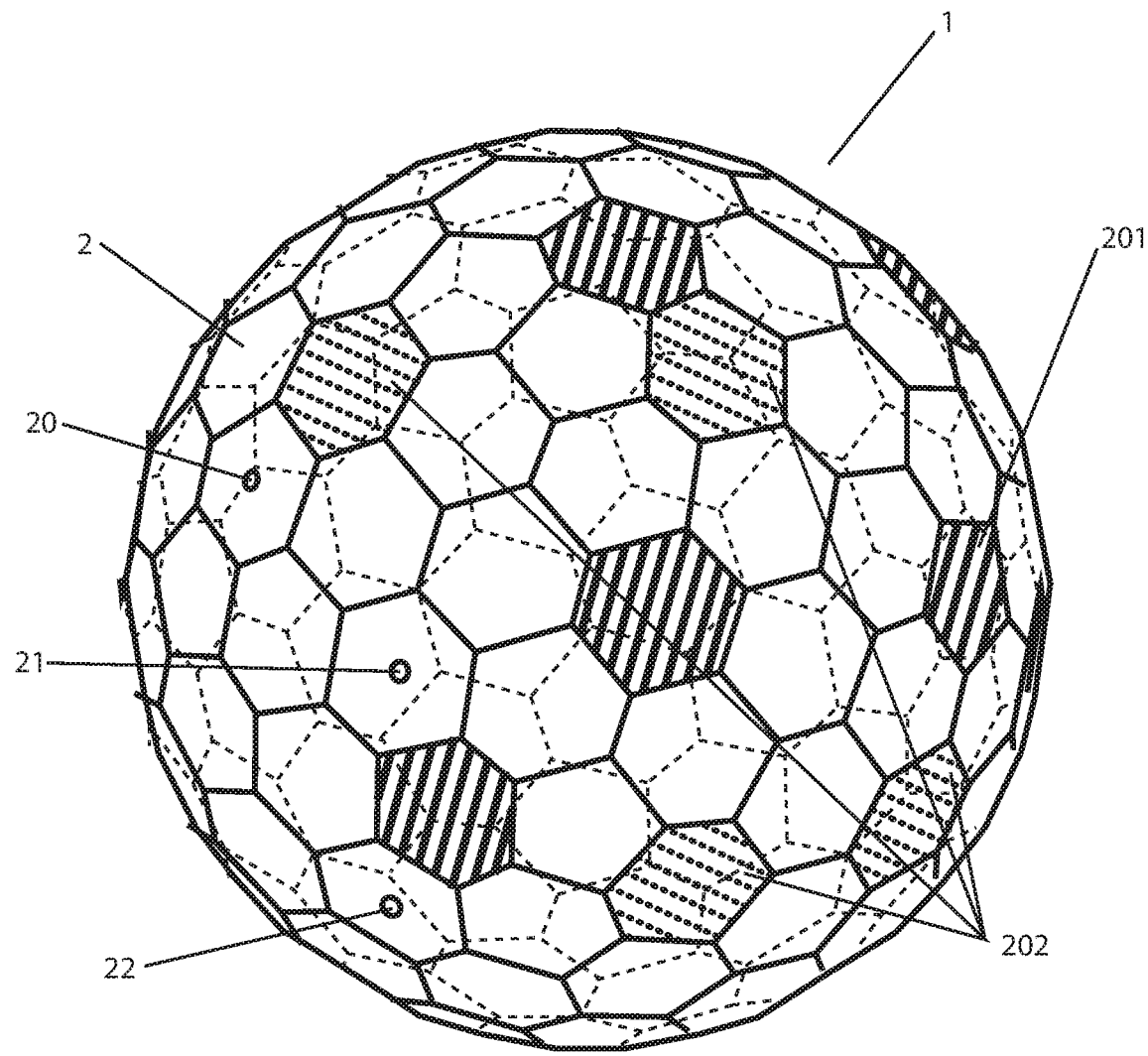
Figure 1C:
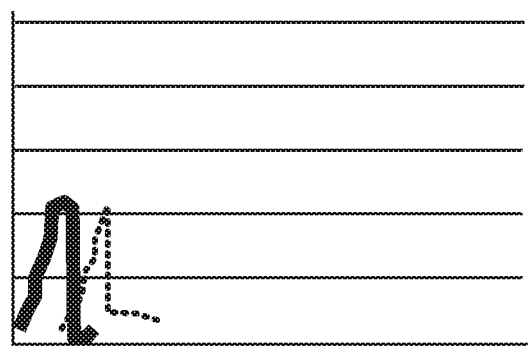

FIG. 1c shows the integrating polyhedron geodesic sphere (1) with a turquoise LED light source element (22) and orange phosphor coated elements (202) added. Note that the blue energy band is less. The green energy band is bolstered by the turquoise LED but would have been more intense had the orange phosphor coated elements (202) not absorbed some green. The green energy is represented by the dotted line in the graphs at the bottom of the figures.

Figure 1D:
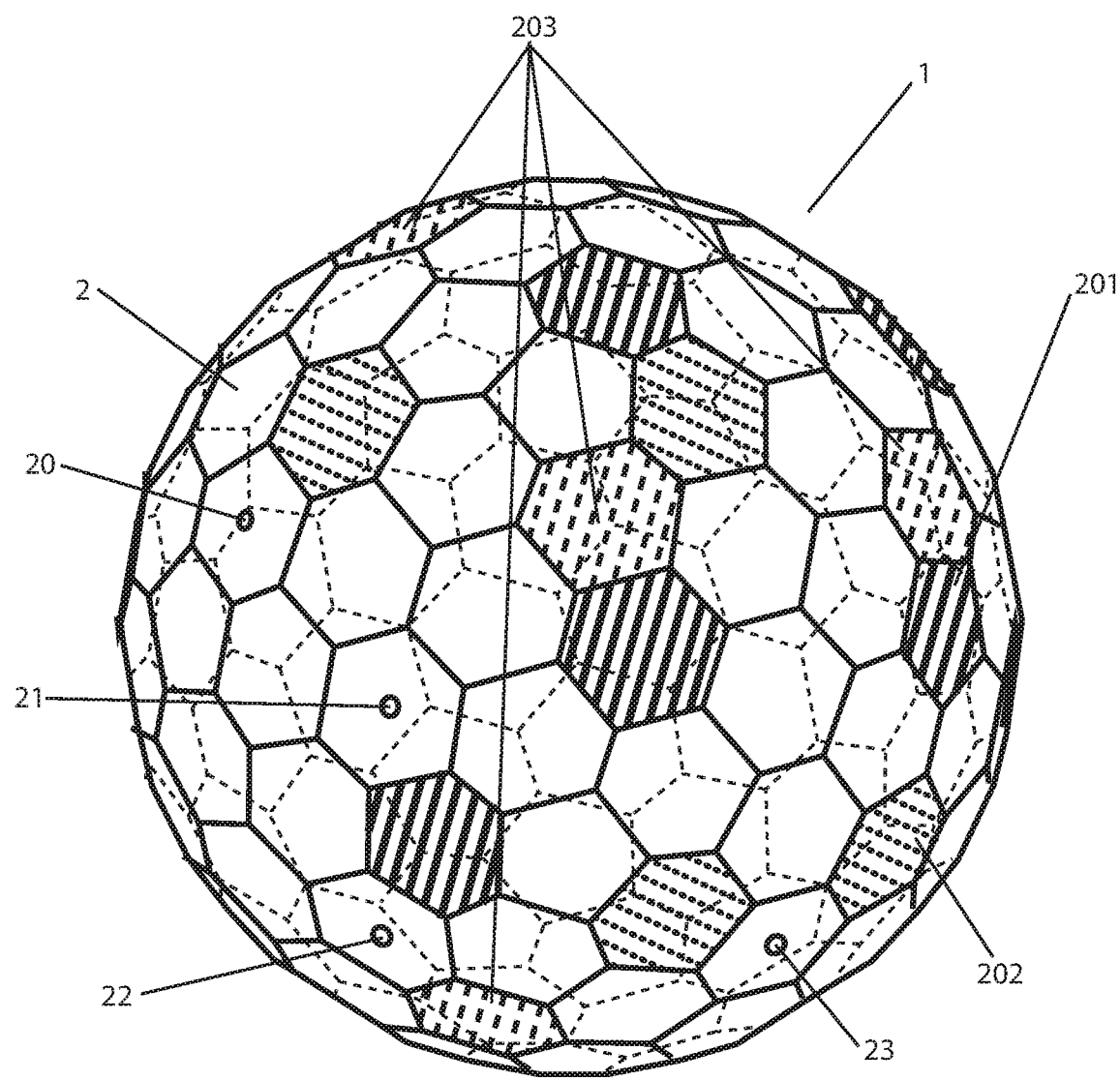
Figure 1D:
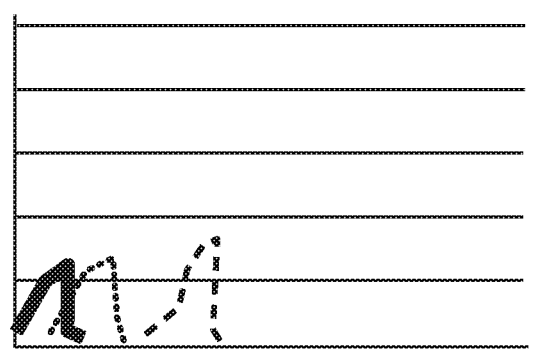

FIG. 1d shows the integrating polyhedron geodesic sphere (1) with a green LED light source element (23) and red phosphor coated elements (203) added. Note that the blue and green energy bands are less. The orange energy band is bolstered by the green LED but would have been more intense had the red phosphor coated elements (203) not absorbed some orange. In this preferred embodiment method configuration, a broadband spectrum is created. Manipulating absorption or reflection of specific wavelength photons by using select pigments in the integrating polyhedron geodesic sphere's (1) inner reflective coating would afford even more control of the spectrum. The orange energy is represented by the dashed line in the graphs at the bottom of the figures.

A novel development tool for estimating the correct ratio of surface areas to implement the preferred embodiment method is also disclosed. When using this development tool small spheres, each used in the same way described above (i.e. as a broad wavelength reflector, a broad wavelength absorber, a narrow wavelength reflector, a narrow wavelength absorber, or a phosphor surface) are inserted into the integrating sphere to simulate the hexahedral elements (2) of the integrating polyhedron geodesic sphere (1) or spherical caps of an integrating sphere.

Since certain changes may be made in the above described method for generating uniformly distributed, diffuse light with a tailored spectrum using one or more light sources, an integrating space, and one or more selected phosphors without departing from the scope of the invention herein involved, it is intended that all matter contained in the description thereof or shown in the accompanying figures shall be interpreted as illustrative and not in a limiting sense.

What is claimed is:

1. A method for generating uniformly distributed and diffuse light within an acceptance cone of an optical fiber or to a cosine connector with a tailored spectrum using an integrating space completely enclosed by multiple surface elements each having interior surfaces, the method comprising:

shining light from one or more differing wavelength light sources located on said interior surfaces of one or more said multiple surface elements of said integrating space;

wherein said interior surfaces of each of said one or more selected multiple surface elements of said integrating space is coated with a broad wavelength reflecting material that reflects all incident light back into said integrating space or one or more selected phosphors that absorb light at a particular wavelength and re-emit all light back into said integrating space at a longer, wavelength; and, collecting said generated uniformly distributed and diffuse light with a tailored spectrum through one or more light output ports located on one or more multiple surface elements of said integrating space and directing said collected light to within said acceptance cone of said optical fiber or to said cosine connector, wherein said integrating space is an integrating polyhedron geodesic sphere.

2. The method of claim 1, further comprising inserting small spheres, each used as either a broad wavelength reflector, a broad wavelength absorber, a narrow wavelength reflector, a narrow wavelength absorber, or a phosphor surface into said integrating sphere to simulate said multiple surface elements of said integrating polyhedron geodesic sphere.

3. A method for generating output light with a tailored spectrum using a light source device that includes an integrating polyhedron geodesic sphere enclosed by multiple interior surface elements and each interior surface element being configured to include a broad wavelength reflector, a narrow wavelength reflector, a broad wavelength absorber, a narrow wavelength absorber, or a phosphor surface, the method comprising:

operating one or more light sources located within the integrating polyhedron geodesic sphere to emit light into the integrating polyhedron geodesic sphere;

converting the emitted light from the one or more light sources located within the integrating polyhedron geodesic sphere at selected surface elements of the multiple surface elements within the integrating polyhedron geodesic sphere that are coated with selected phosphors, respectively, into converted optical wavelengths each being longer than an optical wavelength of the emitted light from each of the one or more light sources;

directing light within the integrating polyhedron geodesic sphere, which includes (1) the emitted light from the one or more light sources prior to any wavelength conversion and (2) converted light from the selected surface elements of the multiple surface elements of the integrating polyhedron geodesic sphere that are coated with selected phosphors, to cause additional optical reflection, diffusion, absorption and wavelength conversion by the multiple surface elements of the integrating polyhedron geodesic sphere to cause the directed light within the integrating polyhedron geodesic sphere to be uniformly distributed with a tailored spectrum; and using an output port at one or more of the multiple interior surface elements of the integrating polyhedron geodesic sphere to output a portion of the light within the integrating polyhedron geodesic sphere that is uniformly distributed with the tailored spectrum as the output light of the integrating polyhedron geodesic sphere.

4. The method as in claim 3, wherein: the multiple interior surface elements within the integrating polyhedron geodesic sphere are configured to by a selective arrangement of using a broad wavelength reflector, a broad wavelength absorber, a narrow wavelength reflector, a narrow wavelength absorber, or a phosphor surface for each interior surface element so that the multiple interior surface elements within the integrating polyhedron geodesic sphere collectively produce the tailored spectrum.

5. The method as in claim 3, wherein each light source located within the integrating polyhedron geodesic sphere is a light emitting diode (LED) to emit light at a specific wavelength into the integrating polyhedron geodesic sphere designed for the tailored spectrum.

6. The method as in claim 3, wherein the multiple surface elements within the integrating polyhedron geodesic sphere include, in addition to the selected surface elements of the multiple surface elements within the integrating polyhedron geodesic sphere that are coated with the selected phosphors for wavelength conversion:
reflective surface elements that are broad wavelength reflectors that reflect a portion of all light at different wavelengths within the integrating polyhedron geodesic sphere.

7. The method as in claim 6, wherein the multiple surface elements within the integrating polyhedron geodesic sphere include, additional reflective surface elements that are narrow wavelength reflectors each of which selectively reflects a portion of light at a particular narrow wavelength band.

8. The method as in claim 3, wherein the multiple surface elements within the integrating polyhedron geodesic sphere include, in addition to the selected surface elements of the multiple surface elements within the integrating polyhedron geodesic sphere that are coated with the selected phosphors for wavelength conversion:
optically absorbing surface elements that are broad wavelength absorbers that absorb a portion of all light at different wavelengths within the integrating polyhedron geodesic sphere.

9. The method as in claim 8, wherein the multiple surface elements within the integrating polyhedron geodesic sphere include, additional optically absorbing surface elements that are narrow wavelength absorbers each of which selectively absorbs a portion of light at a particular narrow wavelength band.

10. A light source device for generating output light with a tailored spectrum, comprising: an integrating polyhedron geodesic sphere enclosed by multiple interior surface elements; one or more light sources located within the integrating polyhedron geodesic sphere to emit light into the integrating polyhedron geodesic sphere; and
an output port at one of the multiple interior surface elements of the integrating polyhedron geodesic sphere to output a portion of the light within the integrating polyhedron geodesic sphere,
wherein the multiple interior surface elements within the integrating polyhedron geodesic sphere include (1) selected wavelength conversion surface elements that are coated with selected phosphors, respectively, each phosphor selected to convert received light at one or more optical wavelengths emitted by the one or more light sources into converted light at longer optical wavelengths, and (2) reflective surface elements that are reflect a portion of all light at different wavelengths within the integrating polyhedron geodesic sphere so that light the within the integrating polyhedron geodesic sphere includes (1) the emitted light from the one or more light sources prior to any wavelength conversion and (2) converted light from the selected wavelength conversion surface elements, and
wherein the integrating polyhedron geodesic sphere operates to cause bouncing of light within the integrating polyhedron geodesic sphere so that the light within the integrating polyhedron geodesic sphere becomes uniformly distributed with a tailored spectrum that is output at the output port.

11. The light source device as in claim 10, further comprising at least one more output port at one of the multiple interior surface elements of the integrating polyhedron geodesic sphere to output another portion of the light within the integrating polyhedron geodesic sphere.

12. The light source device as in claim 10, wherein each light source located within the integrating polyhedron geodesic sphere is a light emitting diode (LED) to emit light at a specific wavelength into the integrating polyhedron geodesic sphere designed for the tailored spectrum.

13. The light source device as in claim 10, wherein the reflective surface elements include broad wavelength reflectors that reflect a portion of all light at different wavelengths within the integrating polyhedron geodesic sphere.

14. The light source device as in claim 10, wherein the reflective surface elements include narrow wavelength reflectors each of which selectively reflects a portion of light at a particular narrow wavelength band.

15. The light source device as in claim 10, wherein the reflective surface elements include (1) broad wavelength reflectors that reflect a portion of all light at different wavelengths within the integrating polyhedron geodesic sphere, and (2) narrow wavelength reflectors each of which selectively reflects a portion of light at a particular narrow wavelength band.

16. The light source device as in claim 10, wherein the reflective surface elements include, in addition to the selected wavelength conversion surface elements and the reflective surface elements, optically absorbing surface elements that absorb a portion of received light.

17. The light source device as in claim 16, wherein the optically absorbing surface elements include broad wavelength reflectors that reflect a portion of all light at different wavelengths within the integrating polyhedron geodesic sphere.

18. The light source device as in claim 16, wherein the optically absorbing surface elements include narrow wavelength absorbers each of which selectively absorbs a portion of light at a particular narrow wavelength band.

* * * * *